United States Patent
Ming-Ching (10) Patent No.: US 6,239,989 B1
(45) Date of Patent: May 29, 2001

(54) FORWARD CONVERTER WITH IMPROVED RESET CIRCUITRY

(76) Inventor: Chou Ming-Ching, 11F-3, No. 8, Wen-Shen 8th St., Nan-Tun Dist., Taichung City (TW)

( * ) Notice: Subject to any disclaimer, the term of this patent is extended or adjusted under 35 U.S.C. 154(b) by 0 days.

(21) Appl. No.: 09/645,518

(22) Filed: Aug. 25, 2000

(51) Int. Cl.$^7$ .................................................... H02M 3/335
(52) U.S. Cl. ................................................ 363/20; 363/21
(58) Field of Search ................................. 363/16, 20, 21

(56) References Cited

U.S. PATENT DOCUMENTS

| | | | |
|---|---|---|---|
| 4,268,898 | * 5/1981 | Brown | 363/20 |
| 5,471,376 | * 11/1995 | Tsai et al. | 363/21 |
| 5,640,318 | * 6/1997 | Leu | 363/16 |
| 5,973,939 | * 10/1999 | Tan | 363/21 |
| 6,038,148 | * 3/2000 | Farrington et al. | 363/21 |
| 6,081,432 | * 6/2000 | Rinne et al. | 363/16 |
| 6,088,247 | * 7/2000 | Cheng | 363/20 |

* cited by examiner

*Primary Examiner*—Jeffrey Sterrett
(74) *Attorney, Agent, or Firm*—Rosenberg, Klein & Lee (57) ABSTRACT

A forward converter has simple auxiliary circuit reset the flux to reduce the voltage stress and extend the maximum work duty, full discharge the magnetizing energy of transformer and forms the voltage waveform keep in "quasi-square" automatically during OFF period.

28 Claims, 6 Drawing Sheets

PRIOR ART

Fig -2(b)

PRIOR ART

FORWARD CONVERTER WITH IMPROVED RESET CIRCUITRY

FIELD OF THE INVENTION

The present invention relates to DC-to-DC converters, AC-to-DC converters. The major characteristic of this converter is that transfer energy from input to output with high efficiency and low circulating energy.

BACKGROUND OF THE INVENTION

In the field of power conversion technology, increasing the work duty and reducing the voltage stress are the most important demands. Basically, tertiary winding reset technology is desirable as it allows forward converter to transfer the power from input to output. However, the work duty of tertiary winding reset forward converter is limited at 50% maximum due to the requirement of voltage-second balance principle and the peak voltage of primary switching device is kept in two times of input voltage. In order to overcome limitations in work duty and voltage stress, the prior art has been devised the active clamp technology and passive clamped technology.

Figure 1A:
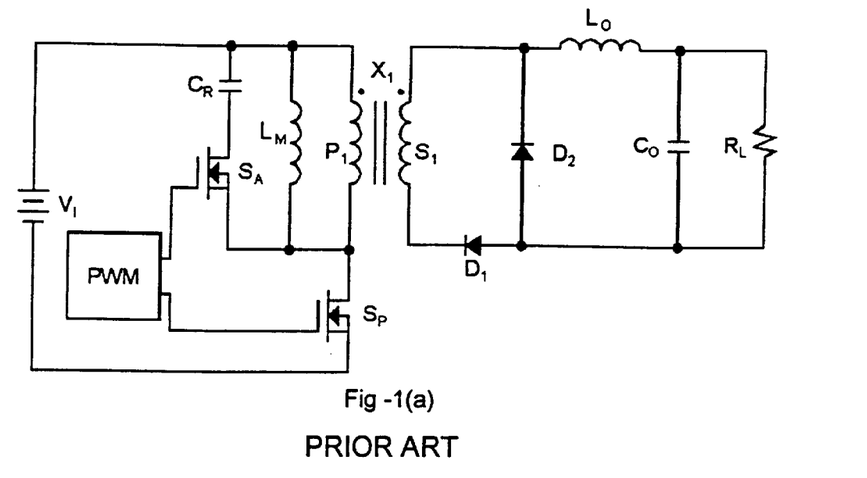
FIG. 1a shows the active clamp forward converter.
Figure 1B:
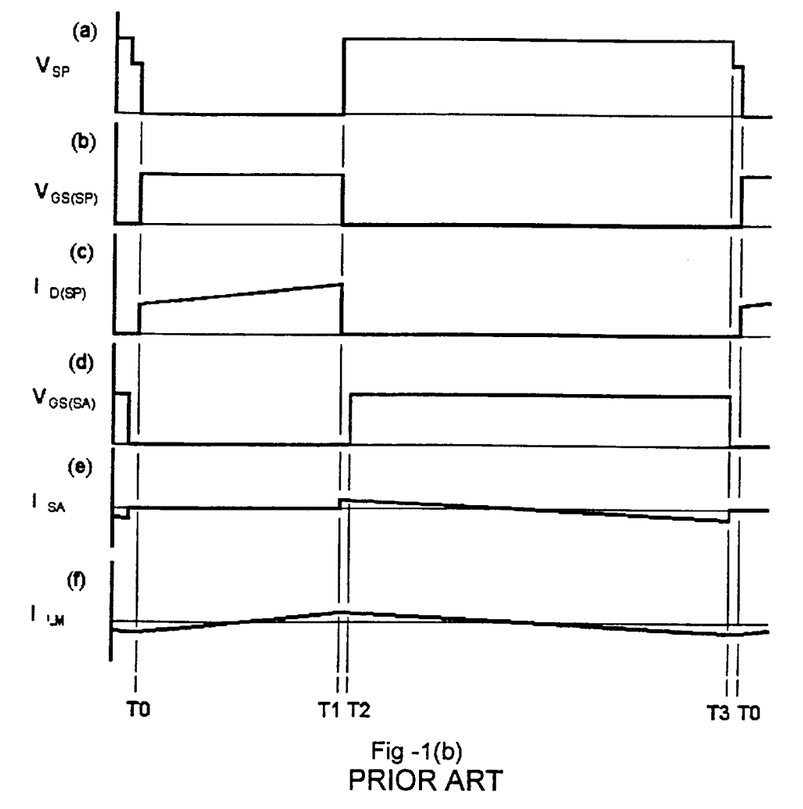

FIG. 1a shows the active clamp forward converter. The active clamp forward converter has been derived from conventional forward converter by adding the switch $S_A$ to select connecting the transformer to a reset capacitor $C_R$ when the primary power switch $S_P$ is turned OFF. The gate driving signals are separated by dead time with small period and supplied from a two channel complementary pulse-width-modulated controller. FIG. 1b shows the timing diagram of the circuit of FIG. 1a.

Active clamp reset technology reduces the voltage stress and allows the work duty is greater then 50% that the power handling of transformer is improved and reduce the power rating of primary switching device. However, the optimal gate drive waveform is generated from highly circuit complexity controller to prevent the damage from cross conduction between $S_A$ and $S_P$, the high side driver is required to control the auxiliary switch $S_A$. The voltage rating of auxiliary switch is equal to input voltage that the component selection is difficult to meet cost effect requirement in high input voltage applications.

Figure 2A:
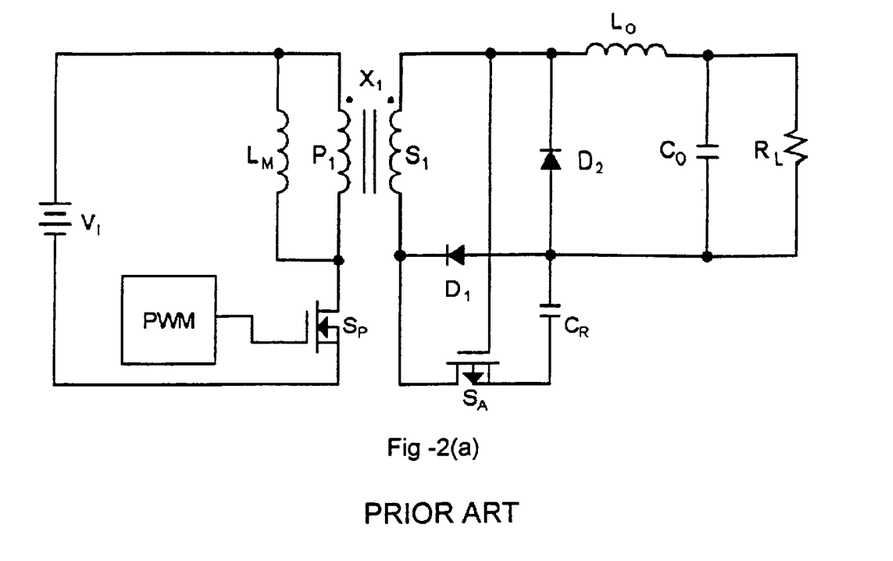
FIG. 2a shows the passive clamp forward converter.
Figure 2B:
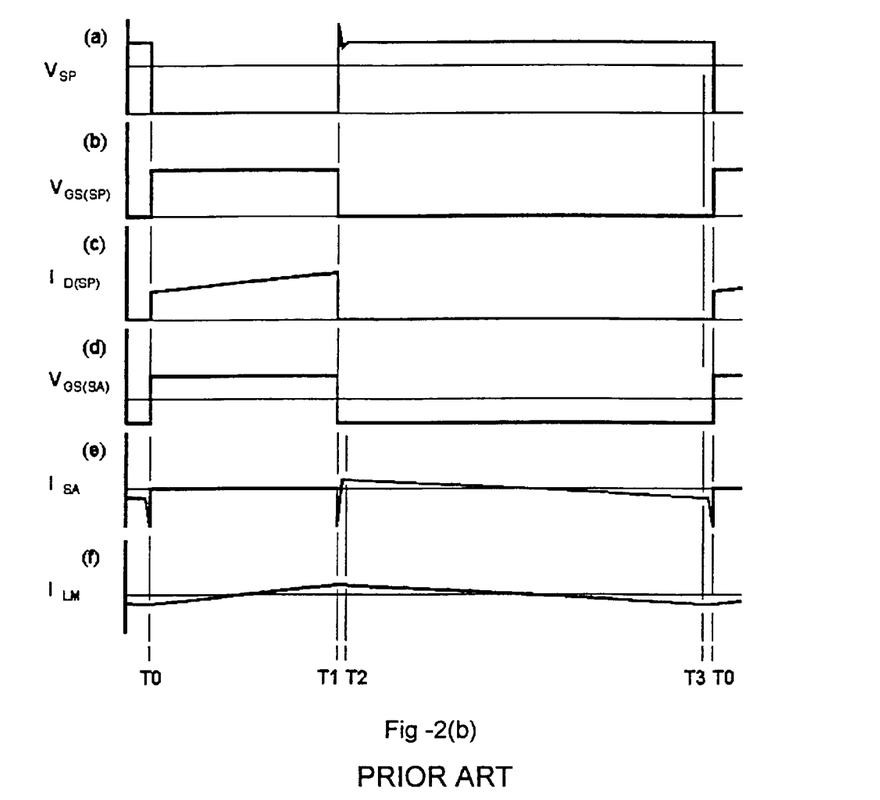

FIG. 2a shows the passive clamp forward converter. The passive clamp forward converter has been derived from active clamp forward converter by relocating the clamp circuit from primary side to secondary side. Auxiliary switch $S_A$ is drives by secondary voltage to select connecting the transformer to a reset capacitor $C_R$ when the primary power switch $S_P$ is turned off. The gate drive signal is supplied from a single channel pulse-width-modulated controller. FIG. 2b shows the timing diagram of the circuit of FIG. 2a. This is a forward converter using the passive clamp technology and drive by a simple PWM controller. The current waveform of auxiliary switch shows low level magnetizing current with small period load current.

Passive clamp technology reduce the voltage rating of auxiliary switch and the circuit complexity of controller, it take advantages as active clamp technology but energy recover of leakage inductance. However, the maximum output current rated auxiliary switch is required to prevent the damage from simultaneous high current due to the transition of secondary voltage. The component selection is difficult to meet cost effect requirement in high output current applications.

What is the best reset technology? Passive drive, less circuit complexity of controller, low rating requirement in high frequency operation are the most important demands of transformer reset technology.

SUMMARY OF THE INVENTION

The invention utilizes a forward converter with new reset concept to enhance the performance of power converter. Briefly, this reset circuit consists of a clamp diode, a reset capacitor, an inductor, an auxiliary switch and an auxiliary diode. The clamp diode provides a single direction path to transfer the magnetizing energy from transformer to reset capacitor when primary power switch is turn OFF and secondary reverse voltage of transformer is turned positive. The auxiliary switch is turn ON to provide a path to discharge the energy from capacitor through the inductor to the source when primary power switch is turn OFF. The auxiliary diode provides the path to conducts the current of inductor when auxiliary switch is turn OFF.

The new converter provides optimal transformer reset: It eliminate the limitation of maximum work duty, as it form the voltage waveform keep in "quasi-square" automatically during OFF period; It simplifies converter construction, as it can be implemented without extra control circuits; It is worked well and do not require any large rating device, as it can be widely used with low cost.

BRIEF DESCRIPTION OF THE DRAWINGS

FIG. 1b shows the timing diagram of the circuit of FIG. 1a.

FIG. 2b shows the timing diagram of the circuit of FIG. 2a.

FIG. 3b shows the timing diagram of the circuit in FIG. 3a.

FIG. 4a shows the transformer magnetizing stage of circuit in FIG. 3a.

FIG. 4b shows the transformer de-magnetizing stage of circuit in FIG. 3a.

DETAILED DESCRIPTION OF THE PREFERRED EMBODIMENTS

Figure 3A:
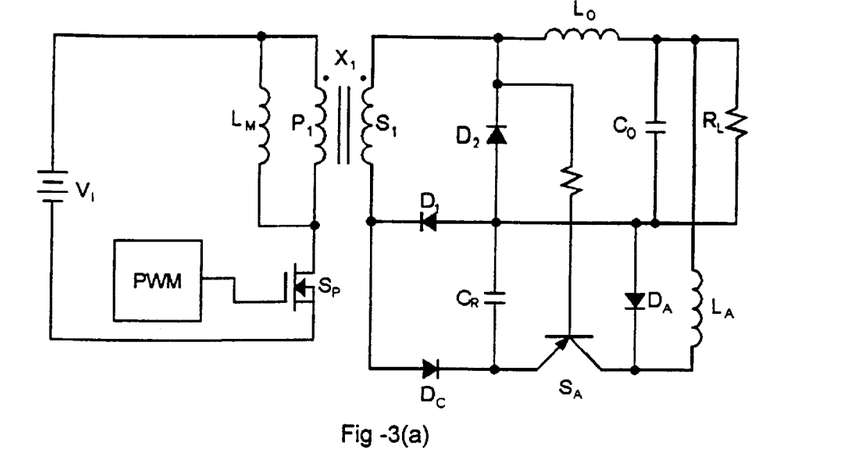
FIG. 3a shows the buck reset forward converter.

Referring now to the drawings, and more particular to FIG. 3a, a buck reset forward converter in accordance with the present invention is illustrated. A buck reset forward converter comprises a conventional forward converter (input source $V_1$, primary switch $S_P$, controller PWM, transformer $T_1$, power rectifiers $D_1$ and $D_2$, smooth choke $L_O$, smooth capacitor $C_O$ and resistive load $R_L$ are included, the smooth choke is large enough to used as an output DC current source and the auxiliary inductor is large enough to used as an resetting DC current source), a clamp diode $D_C$, an auxiliary diode $D_A$, a reset capacitor $C_R$, an auxiliary switch $S_A$ and an auxiliary inductor $L_A$. The clamp diode $D_C$ provides a single direction path to transfer the magnetizing energy from transformer secondary to reset capacitor $C_R$ when primary power switch is turn OFF. The auxiliary switch $S_A$ is turn ON passively to provide a path to discharge the energy from reset capacitor $C_R$ through the auxiliary inductor $L_A$ to the output load $R_L$ when secondary voltage of transformer is negative. The auxiliary diode $D_A$ provides the path to conducts the current of auxiliary inductor $L_A$ when auxiliary switch $S_A$ is turn OFF.

Figure 3B:
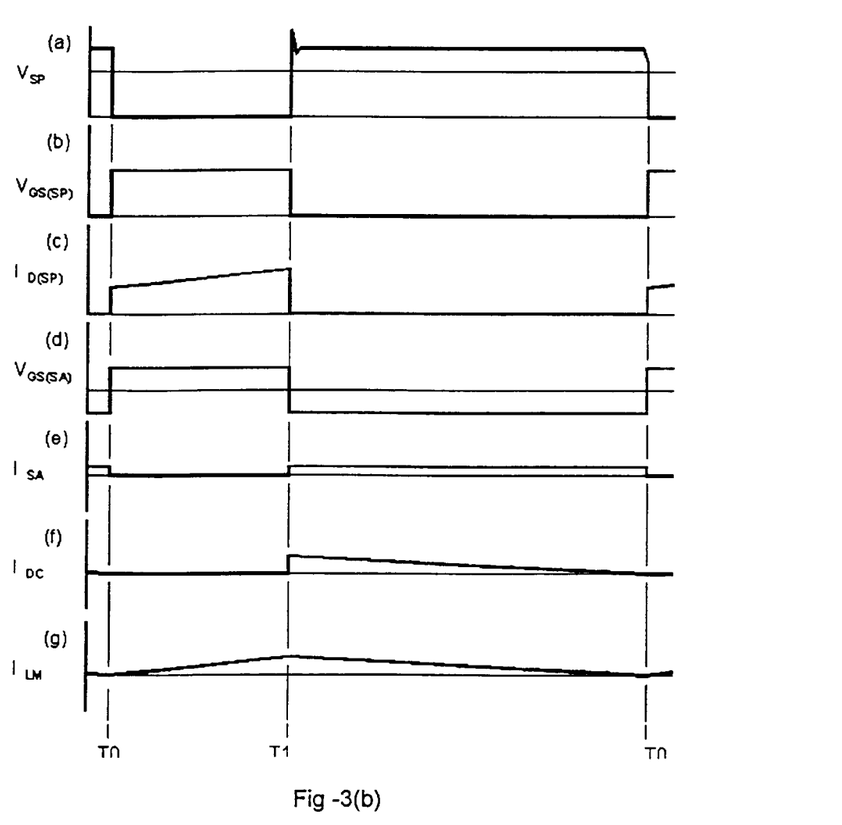

A buck reset topology with forward converter show in FIG. 3a whose typical operation waveforms show in FIG. 3b is different from that of the prior art active clamp technology or passive clamp technology with the same converter. Under steady-state operation, two stages are equal to two equivalent circuits within one switching cycle shown in FIG. 4a and FIG. 4b.

Figure 4A:
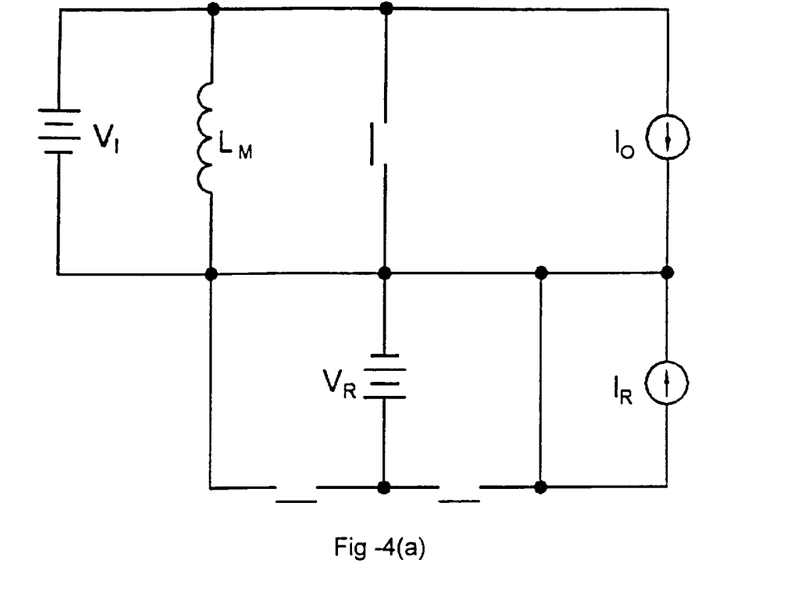

Referring to FIG. 4a, during T0 to T1 interval, the primary power switch $S_P$ is turned ON at T0 and the inductor current of smooth choke as a current source $I_O$ is transferred from input source $V_I$ to the output load, the current of magnetizing inductance $L_M$ is charged by input source $V_I$ and increased linearly from zero. The current of auxiliary inductor is conducted through auxiliary diode $D_A$ to the smooth capacitor $C_O$ as a current source $I_R$ during this interval.

Figure 4B:
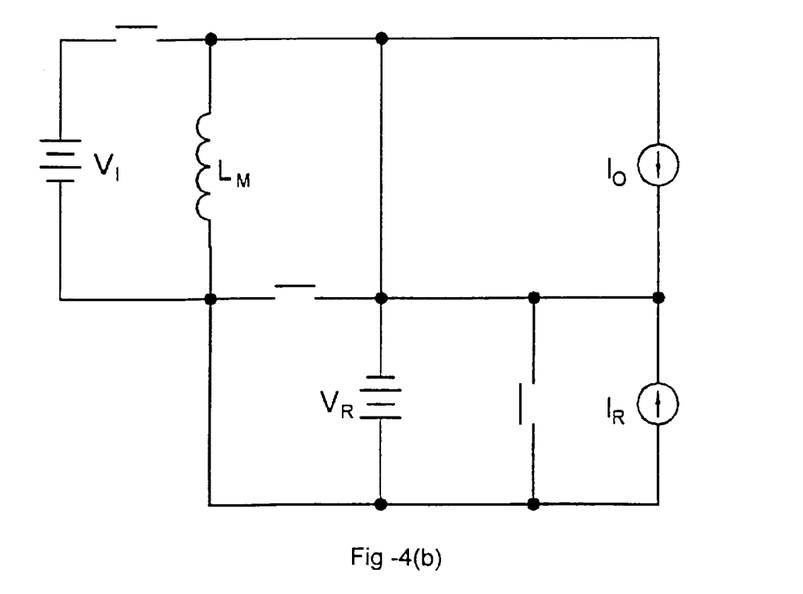

Referring to FIG. 4b, from T1 to T0 interval, the primary power switch $S_P$ is turned OFF at T1 and the current of smooth choke $L_O$ is conducts through power rectifier $D_2$. The auxiliary switch $S_A$ is turned ON via reversed secondary voltage and the auxiliary diode $D_A$ is turned OFF. The magnetizing current of transformer is coupled to secondary side through the clamp diode $D_C$ and charge to reset capacitor $C_R$. The capacitance of reset capacitor $C_R$ is large enough to be used as a reset voltage source $V_R$. The current of auxiliary inductor is through the auxiliary switch $S_A$ and supplies from reset voltage source $V_R$. This interval ends at T0, when the magnetizing current of transformer goes zero, the primary power switch $S_P$ is turn ON again to starting the next switching cycle.

Figure 5:
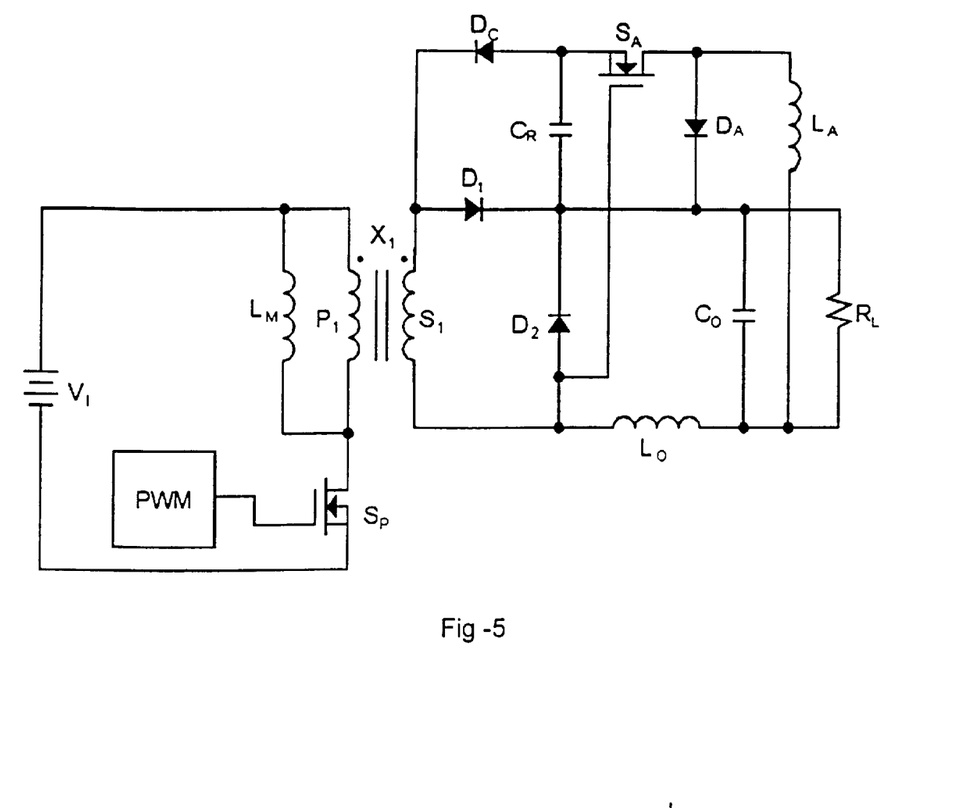
FIG. 5 shows the topological variations of buck reset forward converter.

It should be noted that reorganize the power circuit and reset circuit by applying duality principle could derive the topological variations of buck reset forward converter show as FIG. 5.

Referring to FIG. 5, when the primary power switch $S_P$ is turned ON, the inductor current of smooth choke is transferred from input source $V_I$ to the output load, the current of magnetizing inductance $L_M$ is charged by input source $V_I$ and increased linearly from zero. The current of auxiliary inductor is conducted through auxiliary diode $D_A$ to the smooth capacitor $C_O$.

When the primary power switch $S_P$ is turned OFF, the current of smooth choke $L_O$ is conducts through power rectifier $D_2$. The auxiliary switch $S_A$ is turned ON via reversed secondary voltage and the auxiliary diode $D_A$ is turned OFF. The magnetizing current of transformer is coupled to secondary side through the clamp diode $D_C$ and charge to reset capacitor $C_R$. The current of auxiliary inductor is through the auxiliary switch $S_A$ to the smooth capacitor $C_O$. The current of magnetizing inductance $L_M$ is discharged to reset capacitor $C_R$ and decreased linearly to zero.

The power rectifiers $D_1$ and $D_2$ show as FIG. 3a could be replaced by MOSFET used as synchronous rectifier to improve the conversion efficiency. The buck reset forward converter with synchronous rectifier show as FIG. 6.

Figure 6:
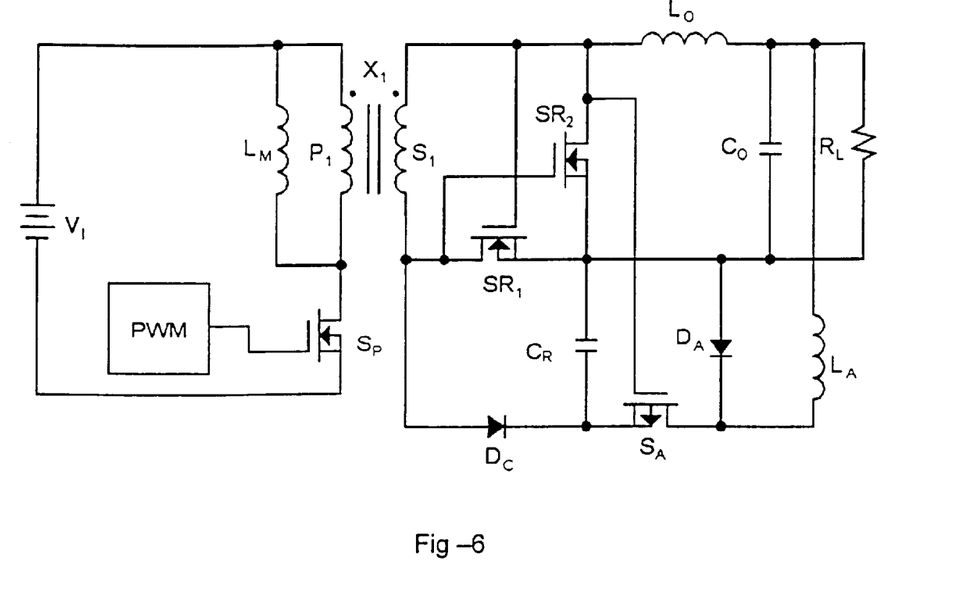
FIG. 6 shows the buck reset forward converter with synchronous rectifier.

Referring to FIG. 6, when the primary power switch $S_P$ is turned ON, the inductor current of smooth choke is conducts from secondary winding through synchronous rectifier $SR_1$ to the output load. The synchronous rectifier $SR_1$ is turn ON via forward voltage of secondary winding and synchronous rectifier $SR_2$ is turn OFF via reverse voltage. The current of magnetizing inductance $L_M$ is charged by input source $V_I$ and increased linearly from zero. The current of auxiliary inductor is conducted through auxiliary diode $D_A$ to the smooth capacitor $C_O$.

When the primary power switch $S_P$ is turned OFF, the current of smooth choke $L_O$ is conducts through synchronous rectifier $SR_2$. The synchronous rectifier $S_R$, is turned OFF by forward voltage of secondary winding and synchronous rectifier $SR_2$ is turn ON via reverse voltage. The auxiliary switch $S_A$ is turned ON via reversed secondary voltage and the auxiliary diode $D_A$ is turned OFF. The magnetizing current of transformer is coupled to secondary side through the clamp diode $D_C$ and charge to reset capacitor $C_R$. The current of auxiliary inductor is through the auxiliary switch $S_A$ to the smooth capacitor $C_O$. The current of magnetizing inductance LM is discharged to reset capacitor $C_R$ and decreased linearly to zero.

Relocation the auxiliary switch and put a simple gat drive network to shift the average level of drive signal to return level may eliminate the auxiliary diode $D_A$. The buck reset forward converter with reorganized reset circuit is show in FIG. 7.

Figure 7:
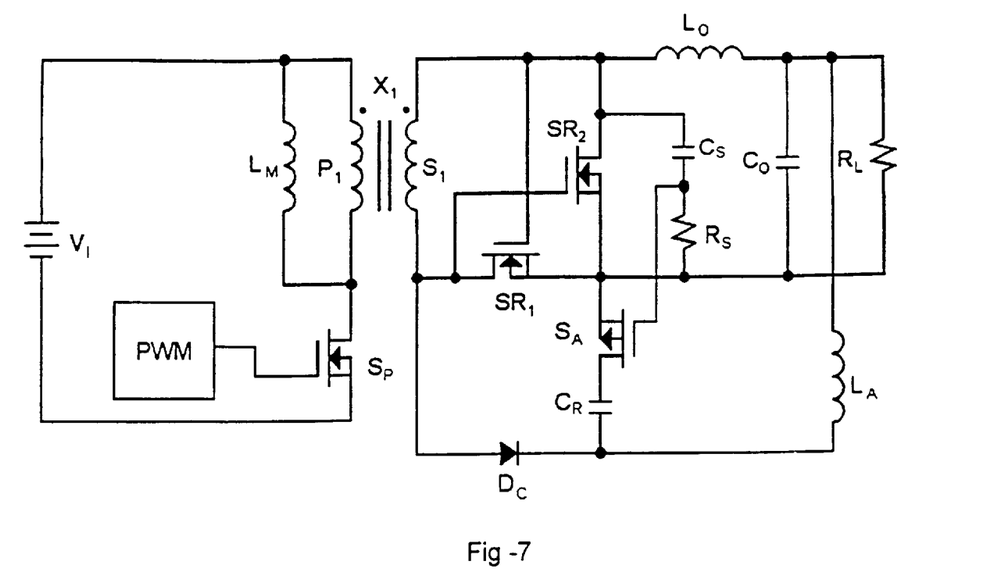
FIG. 7 shows buck reset forward converter with reorganized reset circuit.

Referring to FIG. 7, when the primary power switch $S_P$ is turned ON, the inductor current of smooth choke is conducts from secondary winding through synchronous rectifier $SR_R$, to the output load. The synchronous rectifier $S_R$, is turn ON via forward voltage of secondary winding and synchronous rectifier $SR_2$ is turn OFF via reverse voltage. The gate voltage of auxiliary switch $S_A$ is turns to positive value to turn OFF the auxiliary switch $S_A$. The current of magnetizing inductance $L_M$ is charged by input source $V_I$ and increased linearly from zero. The current of auxiliary inductor is conducted through clamp diode $D_C$ and synchronous rectifier $SR_1$ to the smooth capacitor $C_O$.

When the primary power switch $S_P$ is turned OFF, the current of smooth choke $L_O$ is conducts through synchronous rectifier $SR_2$. The synchronous rectifier $SR_1$ is turned OFF via forward voltage of secondary winding and synchronous rectifier $SR_2$ is turn ON via reverse voltage. The gate voltage of auxiliary switch $S_A$ is turn to negative value of output voltage to turn ON the auxiliary switch $S_A$. The magnetizing current of transformer is coupled to secondary side through the clamp diode $D_C$ and charge to reset capacitor $C_R$. The current of auxiliary inductor is through the auxiliary switch $S_A$ and reset capacitor $C_R$ to the smooth capacitor $C_O$. The current of magnetizing inductance $L_M$ is discharged to reset capacitor $C_R$ and decreased linearly to zero.

The reset circuit show as FIG. 7 can be apply in primary side and drive by main control signal to recover the stored energy of leakage inductance and reset the flux of transformer. The buck reset forward converter with primary side reset circuit is show in FIG. 8.

Figure 8:
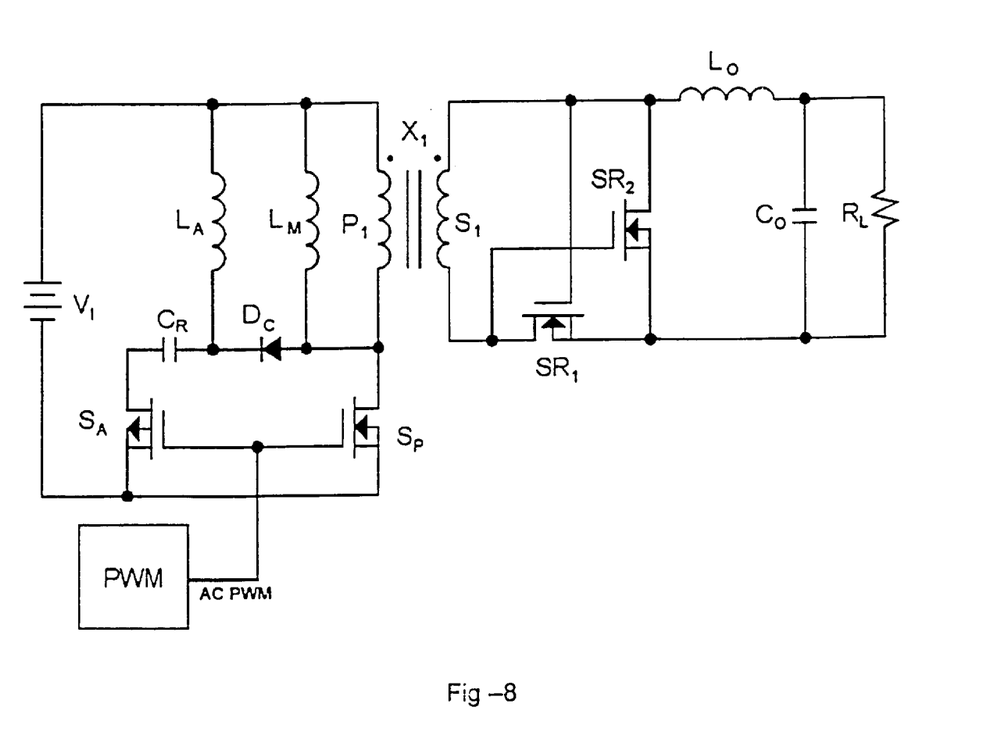
FIG. 8 shows buck reset forward converter with primary side reset circuit.

Referring to FIG. 8, when the voltage of PWM controller is turns to positive value, the primary power switch $S_P$ is turned ON and the auxiliary switch $S_A$ is turned OFF, the inductor current of smooth choke is conducts from secondary winding through synchronous rectifier $SR_1$ to the output load. The synchronous rectifier $SR_1$ is turn ON via forward voltage of secondary winding and synchronous rectifier $SR_2$ is turn OFF via reverse voltage. The current of magnetizing inductance $L_M$ is charged by input source $V_I$ and increased linearly from zero. The current of auxiliary inductor is conducted through clamp diode $D_C$ and primary power switch $S_P$ to the input source $V_I$.

When the voltage of PWM controller is turns to negative value, the primary power switch $S_P$ is turned OFF and the auxiliary switch $S_A$ is turned ON, the current of smooth choke $L_O$ is conducts through synchronous rectifier $SR_2$. The synchronous rectifier $S_R$, is turned OFF via forward voltage of secondary winding and synchronous rectifier $SR_2$ is turn ON via reverse voltage. The magnetizing current of transformer is through the clamp diode Dc and charge to reset capacitor $C_R$. The current of auxiliary inductor is through the auxiliary switch $S_A$ and reset capacitor $C_R$ to the input source $V_I$. The current of magnetizing inductance $L_M$ is discharged to reset capacitor $C_R$ and decreased linearly to zero.

A buck reset forward converter eliminate the limitation of maximum work duty, as it forms the voltage waveform keep in "quasisquare" automatically during OFF period; It simplifies converter construction, as it can be implemented without extra control circuits; It is worked well and do not require any large rating device, as it can be widely used with low cost.

While the invention has been described in terms of a single preferred embodiment, those skilled in the art will recognize that the invention can be practiced with modification within the spirit and scope of the appended claims.

What is claimed is:

1. A buck reset forward converter comprising:
   a smooth choke connected in series with a smooth capacitor;
   a resistive load connected in parallel with said smooth capacitor;
   a transformer comprising a primary winding and a secondary winding, said primary winding being connected to an input DC voltage source, said secondary winding being connected to said smooth choke;
   a controller;
   a switch connected in series with said primary winding, and controlled via said controller for being periodically and alternately turned ON and turned OFF;
   a forward switch connected in series with said secondary winding, and controlled via forward voltage of said secondary winding such that (a) said forward switch is opened when forward voltage of said secondary winding is negative, and (b) said forward switch is closed when forward voltage of said secondary winding is positive;
   a fly-wheeling switch connected in parallel with said smooth choke, connected in series with said smooth capacitor, and controlled via forward voltage of said secondary winding such that (a) said fly-wheeling switch is closed when forward voltage of said secondary winding is negative, and (b) said fly-wheeling switch is opened when forward voltage of said secondary winding is positive;
   a clamp diode connected in series between an storage capacitor and said secondary winding, and controlled via reverse voltage of said secondary winding such that (a) said clamp diode is opened when reverse voltage of said secondary winding is less than the voltage of said storage capacitor, and (b) said clamp diode is closed when reverse voltage of said secondary winding is greater than the voltage of said storage capacitor;
   an auxiliary inductor connected in series with said smooth capacitor;
   an auxiliary switch connected between said storage capacitor and said auxiliary inductor, and controlled via forward voltage of said secondary winding such that (a) said auxiliary switch is closed when forward voltage of said secondary winding is negative, and (b) said auxiliary switch is opened when forward voltage of said secondary winding is positive;
   an auxiliary diode connected to said auxiliary inductor and said auxiliary switch such that (a) said auxiliary diode is opened when said auxiliary switch is closed, and (b) said auxiliary diode is closed when said auxiliary switch is opened.

2. The buck reset forward converter of claim 1 wherein said forward switch is a diode.

3. The buck reset forward converter of claim 1 wherein said fly-wheeling switch is a diode.

4. The buck reset forward converter of claim 1 wherein said forward switch is MOSFET transistor with an integral reverse diode.

5. The buck reset forward converter of claim 1 wherein said fly-wheeling switch is a MOSFET transistor with an integral reverse diode.

6. The buck reset forward converter of claim 1 wherein said auxiliary switch is a MOSFET transistor.

7. The buck reset forward converter of claim 1 wherein said auxiliary switch is a bipolar junction transistor.

8. A buck reset forward converter comprising:
   a smooth choke connected in series with a smooth capacitor;
   a resistive load connected in parallel with said smooth capacitor;
   a transformer comprising a primary winding and a secondary winding, said primary winding being connected to an input DC voltage source, said secondary winding being connected to said smooth choke;
   a controller;
   a switch connected in series with said primary winding, and controlled via said controller for being periodically and alternately turned ON and turned OFF;
   a forward switch connected in series with said secondary winding, and controlled via forward voltage of said secondary winding such that (a) said forward switch is opened when forward voltage of said secondary winding is negative, and (b) said forward switch is closed when forward voltage of said secondary winding is positive;
   a fly-wheeling switch connected in parallel with said smooth choke, connected in series with said smooth capacitor, and controlled via forward voltage of said secondary winding such that (a) said fly-wheeling switch is closed when forward voltage of said secondary winding is negative, and (b) said fly-wheeling switch is opened when forward voltage of said secondary winding is positive;
   a clamp diode connected in series between an storage capacitor and said primary switch, and controlled via off-state voltage of said primary switch such that (a) said clamp diode is opened when off-state voltage of said primary switch is less than the voltage of said storage capacitor, and (b) said clamp diode is closed when off-state voltage of said primary switch is greater than the voltage of said storage capacitor;
   an auxiliary inductor connected in series with said input DC voltage source; and
   an auxiliary switch connected between said storage capacitor and said auxiliary inductor, controlled via said controller such that (a) said auxiliary switch is closed when said primary switch is OFF, and (b) said auxiliary switch is opened when said primary switch is ON.

9. The buck reset forward converter of claim 8 wherein said forward switch is a diode.

10. The buck reset forward converter of claim 8 wherein said fly-wheeling switch is a diode.

11. The buck reset forward converter of claim 8 wherein said forward switch is a MOSFET transistor with an integral reverse diode.

12. The buck reset forward converter of claim 8 wherein said fly-wheeling switch is MOSFET transistor with an integral reverse diode.

13. The buck reset forward converter of claim 8 wherein said auxiliary switch is a MOSFET transistor.

14. The buck reset forward converter of claim 8 wherein said auxiliary switch is a bipolar junction transistor.

15. A buck reset forward converter comprising:
   a smooth choke connected in series with a smooth capacitor;
   a resistive load connected in parallel with said smooth capacitor;
   a transformer comprising a primary winding and a secondary winding, said primary winding being connected to an input DC voltage source, said secondary winding being connected to said smooth choke;
   a controller;
   a switch connected in series with said primary winding, and controlled via said controller for being periodically and alternately turned ON and turned OFF;
   a forward switch connected in series with said secondary winding, and controlled via forward voltage of said secondary winding such that (a) said forward switch is opened when forward voltage of said secondary winding is negative, and (b) said forward switch is closed when forward voltage of said secondary winding is positive;
   a fly-wheeling switch connected in parallel with said smooth choke, connected in series with said smooth capacitor, and controlled via forward voltage of said secondary winding such that (a) said fly-wheeling switch is closed when forward voltage of said secondary winding is negative, and (b) said flywheeling switch is opened when forward voltage of said secondary winding is positive;
   a clamp diode connected in series between an storage capacitor and said secondary winding, and controlled via reverse voltage of said secondary winding such that (a) said clamp diode is opened when reverse voltage of said secondary winding is less than the voltage of said storage capacitor, and (b) said clamp diode is closed when reverse voltage of said secondary winding is greater than the voltage of said storage capacitor;
   an auxiliary inductor connected in series between said smooth capacitor and said clamp diode;
   an auxiliary switch connected between said storage capacitor and secondary return, and controlled via forward voltage of said secondary winding such that (a) said auxiliary switch is closed when forward voltage of said secondary winding is negative, and (b) said auxiliary switch is opened when forward voltage of said secondary winding is positive.

16. The buck reset forward converter of claim 15 wherein said forward switch is a diode.

17. The buck reset forward converter of claim 15 wherein said fly-wheeling switch is a diode.

18. The buck reset forward converter of claim 15 wherein said forward switch is a MOSFET transistor with an integral reverse diode.

19. The buck reset forward converter of claim 15 wherein said fly-wheeling switch is a MOSFET transistor with an integral reverse diode.

20. The buck reset forward converter of claim 15 wherein said auxiliary switch is a MOSFET transistor.

21. The buck reset forward converter of claim 15 wherein said auxiliary switch is a bipolar junction transistor.

22. A buck reset forward converter comprising:
   a smooth choke connected in series with a smooth capacitor;
   a resistive load connected in parallel with said smooth capacitor;
   a transformer comprising a primary winding and a secondary winding, said primary winding being connected to an input DC voltage source, said secondary winding being connected to said smooth choke;
   a controller;
   a switch connected in series with said primary winding, and controlled via said controller for being periodically and alternately turned ON and turned OFF;
   a forward switch connected in series with said secondary winding, and controlled via forward voltage of said secondary winding such that (a) said forward switch is opened when forward voltage of said secondary winding is negative, and (b) said forward switch is closed when forward voltage of said secondary winding is positive;
   a fly-wheeling switch connected in parallel with said smooth choke, connected in series with said smooth capacitor, and controlled via forward voltage of said secondary winding such that (a) said fly-wheeling switch is closed when forward voltage of said secondary winding is negative, and (b) said fly-wheeling switch is opened when forward voltage of said secondary winding is positive;
   a clamp diode connected in series between an storage capacitor and said primary switch, and controlled via off-state voltage of said primary switch such that (a) said clamp diode is opened when off-state voltage of said primary switch is less than the voltage of said storage capacitor, and (b) said clamp diode is closed when off-state voltage of said primary switch is greater than the voltage of said storage capacitor;
   an auxiliary inductor connected in series between said input DC voltage source and said storage capacitor;
   an auxiliary switch connected between said storage capacitor and primary return, and controlled via voltage of said PWM controller such that (a) said auxiliary switch is closed when said primary switch is OFF, and (b) said auxiliary switch is opened when said primary switch is ON.

23. The buck reset forward converter of claim 22 wherein said forward switch is a diode.

24. The buck reset forward converter of claim 22 wherein said fly-wheeling switch is a diode.

25. The buck reset forward converter of claim 22 wherein said forward switch is a MOSFET transistor with an integral reverse diode.

26. The buck reset forward converter of claim 22 wherein said fly-wheeling switch is a MOSFET transistor with an integral reverse diode.

27. The buck reset forward converter of claim 22 wherein said auxiliary switch is a MOSFET transistor.

28. The buck reset forward converter of claim 22 wherein said auxiliary switch is a bipolar junction transistor.

* * * * *